Aug. 14, 1934.      B. R. SCHABARUM      1,970,433
VALVE CONTROLLING MECHANISM FOR STEAM ENGINES
Filed Jan. 27, 1931      2 Sheets-Sheet 1

INVENTOR
B. R. Schabarum

Patented Aug. 14, 1934

1,970,433

UNITED STATES PATENT OFFICE

1,970,433

VALVE CONTROLLING MECHANISM FOR STEAM ENGINES

Bruno R. Schabarum, Toledo, Ohio, assignor to The National-Superior Company, Toledo, Ohio, a corporation of Delaware Application January 27, 1931, Serial No. 511,459

5 Claims. (Cl. 121—115)

My invention relates to means for controlling the sliding valves of duplex double-acting steam engines.

One object of this invention is to operate the sliding valves by steam from the power cylinders when the pistons reach predetermined positions. Another object is to provide novel steam actuated valve mechanism for controlling the operation of the sliding valves for reversing the direction of travel of the pistons.

The accompanying drawings illustrate for purposes of exemplification but without limitation of the claimed invention thereto, certain practical embodiments of the principles of this invention.

Figure 1:
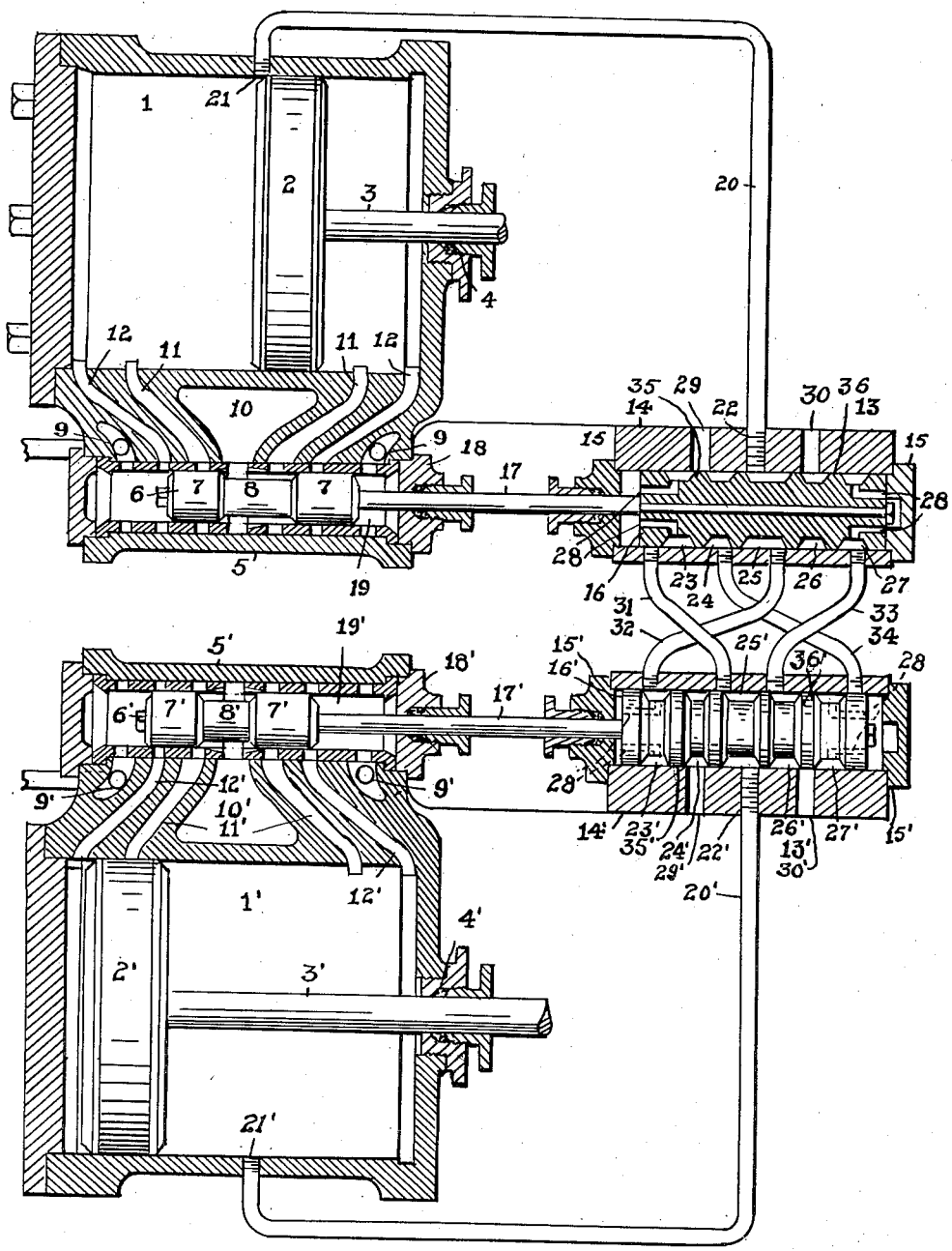
Figure 2:
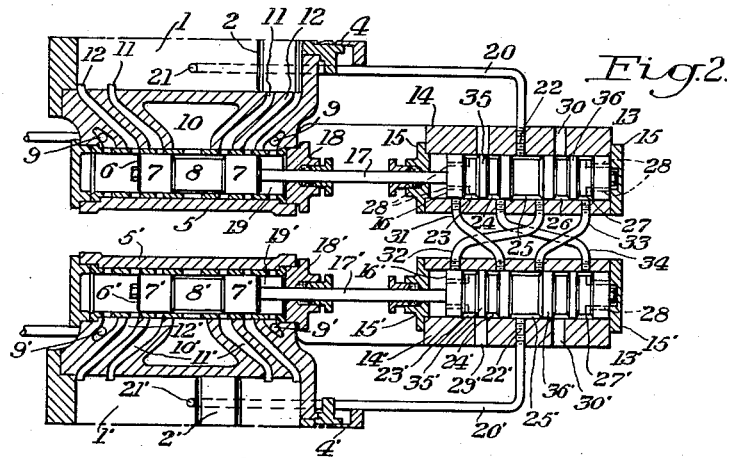
Figure 3:
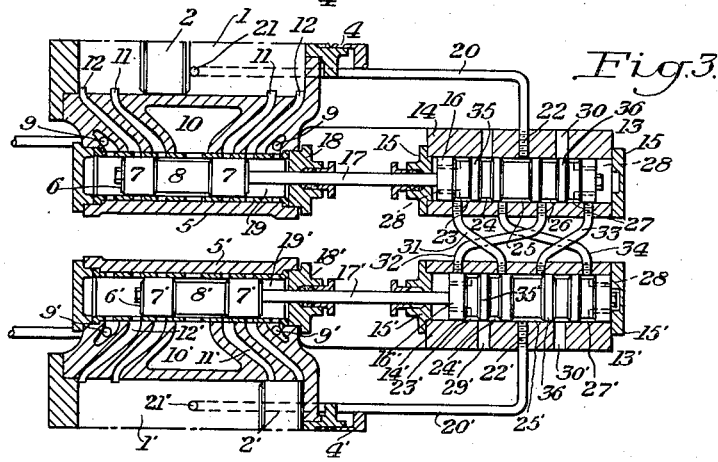
Figure 4:
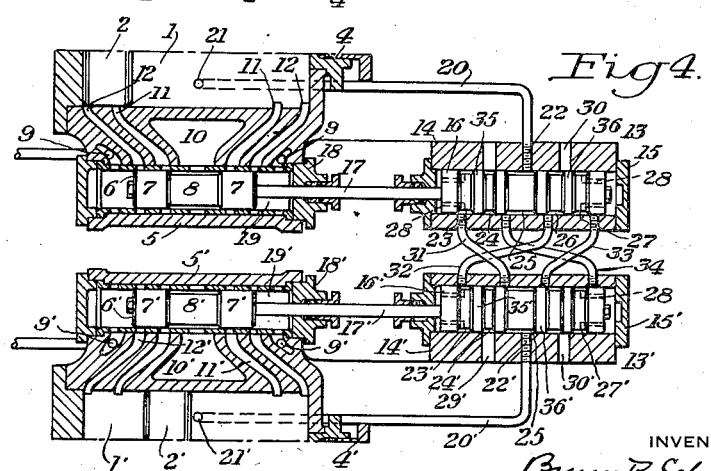

Fig. 1 is a longitudinal view in section of an engine embodying the novel features of this invention, some of the parts being omitted or broken away, the moving parts being in what might be termed the first position of their operating cycle. Fig. 2 is a like view on smaller scale showing the moving parts in the second position, while Figs. 3 and 4 are similar views showing the third and fourth positions, respectively.

On the drawings, 1 and 1' designate two power cylinders of a duplex double-acting steam engine and 2 and 2' are the power pistons reciprocable in the respective cylinders and arranged 90° apart. 3 and 3' are piston rods attached to the respective pistons 2 and 2', the ends of the piston rods being broken away beyond the stuffing boxes 4 and 4' in which they reciprocate. These piston rods may be attached to any mechanisms to which the pistons of duplex engines are applicable, a duplex pump being one example of such a mechanism.

Steam chests 5 and 5' of the two cylinders have duplicate sliding valves 6 and 6' having terminal heads 7 and 7' with intervening necks 8 and 8'. The valve chests have steam inlet ports 9 and 9' through which steam is conveyed to the outer ends of both of the valves 6 and 6' which are of equal cross-areas so that they are always balanced as to pressure tending to move them longitudinally. The steam chests have exhaust ports 10 and 10' which are connected to the exhaust passages 11 and 11' according to the positions of the sliding valves. Steam is admitted to the cylinders 1 and 1' through the passages 12 or 12' according to the positions of the sliding valves. The mechanism so far described will be readily understood by those acquainted with the steam engine art.

I provide two controlling valve mechanisms 13 and 13' for operating the sliding valves 6 and 6'. These mechanisms comprise cylinders 14 and 14' provided with closed ends 15 and 15' and reciprocating valves 16 and 16'. The respective valves 16 and 16' are connected to the valves 6 and 6' by the reciprocable rods 17 and 17' which operate in the packing boxes in the left-hand ends 15 and 15' and in the adjacent ends 18 and 18' of the cylinders 19 and 19' in which the valves 6 and 6' work.

Steam pipes 20 and 20' connect the central ports 21 and 21' to the central ports 22 and 22' in the cylinders 14 and 14'. The valves 16 and 16' have the annular peripheral passages or recesses 23 and 23', 24 and 24', 25 and 25', 26 and 26', and 27 and 27', which are respectively power, exhaust, distributing, exhaust, and power recesses. The ports 22 and 22' open into the passages 25 and 25' at all positions of the valves 16 and 16'. Each end of each valve 16 and 16' is provided with reduced passages 28 leading from the passages 23, 23' and 27, 27' to the ends of the cylinders 14 and 14'. There are two exhaust ports 29, 29' and 30, 30' in the cylinders 14 and 14' at opposite sides of the ports 22 and 22'. The interiors of the cylinders 14 and 14' are connected together by the pipes 31, 32, 33, and 34 in a manner to be described.

The piston 2' is shown at the limit of its left hand stroke in Fig. 1. The sliding valve 6' is now to be shifted to its right hand limit to permit steam to enter at the left hand end of the cylinder 1' and to provide for the exhaust of steam at the right hand end of the cylinder.

The piston 2 is supposed to be moving to the right. It has just uncovered the port 21 allowing steam to pass through the pipe 20 to the annular passage 25 whence it goes through the pipe 32 to the annular passage 23'. It then goes through the left hand passages 28 of the valve 16' and pushes the latter to the right to its extreme position, as in Fig. 2 corresponding to that occupied by the valve 16 in the cylinder 14. As the valve 16' moves to the right any steam or air trapped in the right hand end of the cylinder 14' escapes by way of the passages 28 in the right hand end of the valve 16' and thence through the passage 27', and the exhaust port 30' to the atmosphere. The shifting of the valve 16' to the right shifts the sliding valve 6' to the right so that steam now passes to the left end of the cylinder 1' from the left hand port 9' and through the left hand inlet passage 12'. The piston 2' now travels to the right while the piston 2 continues its travel in the same direction.

The valve 16 remains as shown until the piston 2 reaches its right hand limit. At this time the piston 2' has just passed the port 21' as illustrated in Fig. 2. Steam now passes through the pipe 20', the passage 25', and the pipe 33, it being remembered that the valve 16' is now at its right hand limit, the parts being positioned like those shown in connection with the valve 16. From the pipe 33 steam goes through the annular passage 27 and the right hand passages 28 of the valve 16 and pushes this valve to its left hand limit as in Fig. 3. This movement of the valve 16 shifts the sliding valve 6 to the left and directs steam into the right hand end of the cylinder 2 and connects the other end of the cylinder to the exhaust port 10.

When the piston 2 passes the port 21 the piston 2' is at its right hand limit as illustrated in Fig. 3. and the steam passes through the pipe 20, the passage 25, the pipe 34, the passage 27', and the passages 28 at the right hand end of the valve 16'. The steam pushes the valve 16' to the position shown in Fig. 4, and the valve 16' pushes the sliding valve 6' to the position shown so that steam now operates against the right hand end of the piston 2', the exhaust being provided into the exhaust port 10' through the right hand passage 11 and around the neck 8' of the valve 6'. Both pistons are now moving to the left.

When the piston 2 reaches its left hand limit the piston 2' uncovers the port 21', as illustrated in Fig. 4, allowing steam to flow through the pipe 20', the passage 25', the pipe 31, the passage 23, and the left hand passages 28 in the valve 16 to the left hand end of the valve 16 which now is shifted to the right to the position shown in Fig. 1. Steam now has access to the left hand end of the cylinder 1, exhaust being provided to the port 10 by way of the right hand passage 11.

When the piston 2 reaches the position shown in Fig. 1 the piston 2' is again at its left hand limit as shown and the cycle described is repeated as long as steam is supplied to the engine.

When the valves 16 and 16' are pushed in either direction, the exhaust or bleeding of any air between these valves and the ends of the cylinders 14 and 14' is provided by the exhaust ports 29, 29' and 30, 30' by way of the adjacent annular passages 23, 23' and 27, 27'. As soon as the valves have moved a short distance these exhaust ports are closed by the annular ribs 35, 35' and 36, 36' which separate the annular passages 23 and 24, 26 and 27, 23' and 24', and 26' and 27'. The valves 16 and 16' thus are cushioned toward the ends of their strokes. The passages 28 are relatively quite small and allow the trapped air to escape slowly. When the ribs close the exhaust ports, the terminal ribs on the valves uncover the ends of the pipes, so that a very slow exhaust takes place through the uncovered pipes and the ports 29, 29', 30, or 30' as the case may be, as is clear from the drawings.

I claim:—

1. For operating the slide valves of a duplex steam engine, the combination of a pair of engine cylinders and a pair of slide valves therefor, a control cylinder for each slide valve, steam connection between the center of said control cylinder and the corresponding engine cylinder, a control piston working in each of said control cylinders and operatively connected to the corresponding slide valve, said control piston being provided with an intermediate circumferential distributing recess which is always in communication with the corresponding steam connection, a pressure recess adjacent each end of said control piston communicating with the corresponding end of the control cylinder, an exhaust recess on each side of the distributing recess, said exhaust recesses being open to atmosphere, and cross connections between the control cylinders arranged so that the reciprocation of either of the control pistons alternately connects the opposite ends of the control cylinder of the other control piston to pressure and exhaust.

2. For operating the slide valves of a duplex steam engine, the combination of a pair of cylinders and a pair of slide valves therefor a control cylinder for each slide valve, steam connection between the center of said control cylinder and the corresponding engine cylinder, a control piston working in each of said control cylinders and operatively connected to the corresponding slide valve, said control piston being provided with an intermediate circumferential distributing recess which is always in communication with the corresponding steam connection, a pressure recess adjacent each end of said control piston communicating with the corresponding end of the control cylinder, an exhaust recess on each side of the distributing recess, said exhaust recesses being open to atmosphere, and cross connections between said control cylinders arranged to alternately connect the opposite ends of a control cylinder with the distributing recess and one of the exhaust recesses of the piston of the other control cylinder as the pistons move whereby the pistons are caused to move in succession first in one and then in the opposite direction in their control cylinders.

3. In a duplex steam engine, the combination with a pair of power cylinders and pistons working therein and a separate slide valve arranged to control the admission of steam to and the relief of steam from each of said power cylinders, of means for operating said slide valves comprising a control cylinder for each slide valve, a steam pipe connecting each power cylinder to the center of the corresponding control cylinder, a control piston working in each control cylinder and coupled to the corresponding slide valve, said piston being provided with an intermediate circumferential distributing recess which is always in communication with the corresponding steam pipe, a pressure recess adjacent each end of each control piston, and communicating with the corresponding end of its control cylinder, an exhaust recess in each control piston on each side of its distributing recess, said exhaust recesses being open to atmosphere, and cross connections between the control cylinders whereby the reciprocation of either of the control pistons in its cylinder alternately connects the opposite ends of the other control cylinder to pressure and to exhaust.

4. In a duplex steam engine, the combination with a pair of power cylinders and pistons working therein and a separate slide valve arranged to control the admission of steam to and the relief of steam from each of said power cylinders, of means for operating said slide valves comprising a control cylinder for each slide valve, a steam pipe connecting each power cylinder to the center of the corresponding control cylinder, a control piston working in each control cylinder and coupled to the corresponding slide valve, said piston being provided with an intermediate circumferential distributing recess which is always in communication with the corresponding steam pipe, a pressure recess adjacent each end of each control piston and communicating with the corresponding end of its control cylinder, an exhaust recess in each control piston on each side of its distributing recess, said exhaust recesses being open to atmosphere, and cross connections between said control cylinders arranged to alternately connect the opposite ends of a control cylinder with the distributing recess and one of the exhaust recesses of the piston of the other control cylinder as the pistons move whereby the pistons are caused to move in succession first in one and then in the opposite direction in their control cylinders.

5. In the control cylinders of a duplex steam engine having power cylinders, power pistons, and slide valves for operating the same, the combination of a control cylinder for each power cylinder, a steam connection between the respective control cylinders to the center of the power cylinders, control pistons in the control cylinders arranged to move the slide valves, a distributing recess in the center of each control piston which is always in communication with the corresponding steam connections, pressure recesses adjacent to each end of the control pistons communicating with the corresponding end of its control cylinder, exhaust recesses in each piston at either side of its distributing recess, said exhaust recesses being open to atmosphere, and cross-connections between the control cylinders arranged to supply pressure to and exhaust pressure from the pressure recesses through the distributing and the exhaust recesses of one control cylinder of the opposite control cylinders in accordance with the progressive movement of the duplex steam engine.

BRUNO R. SCHABARUM.